UNITED STATES PATENT OFFICE.

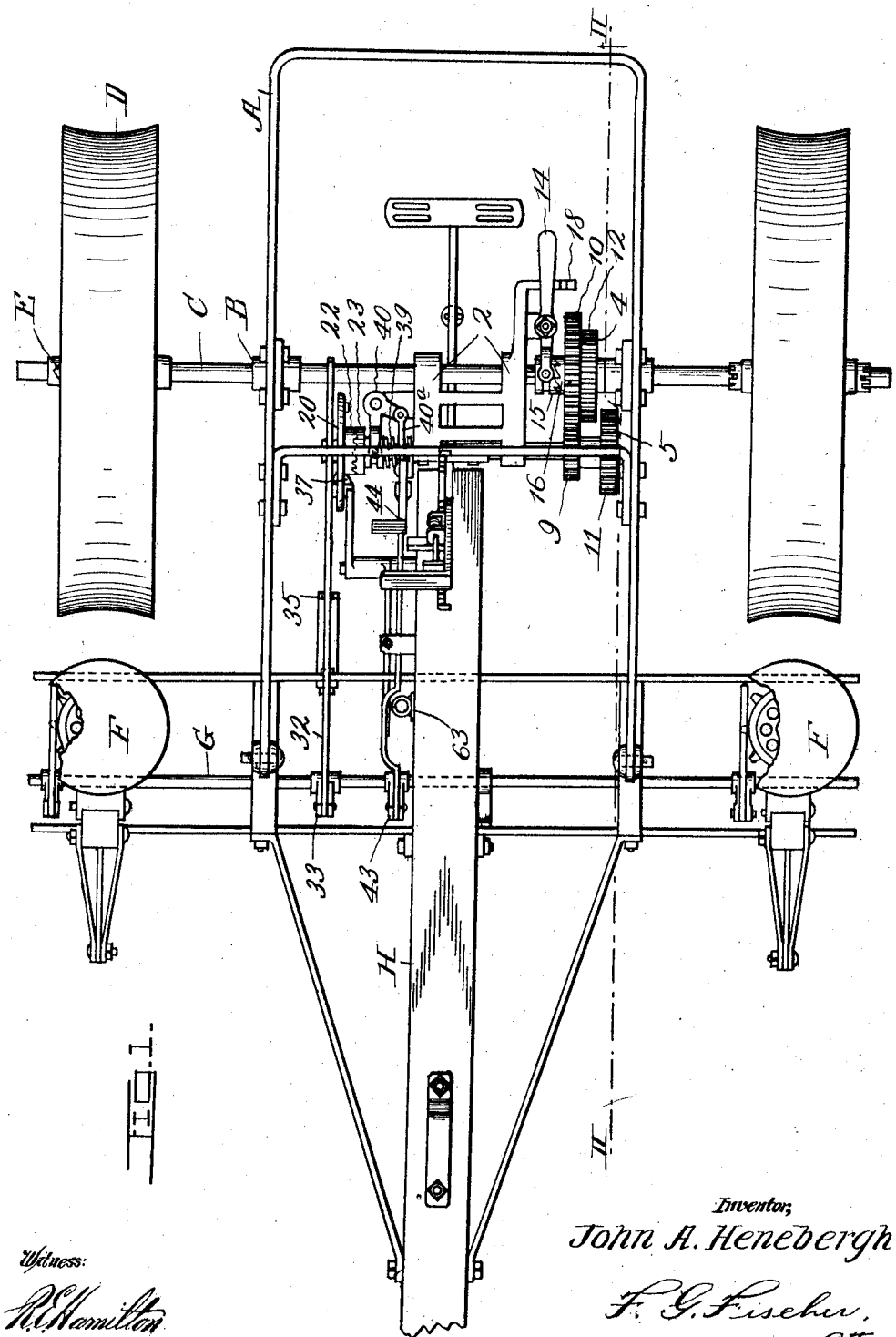

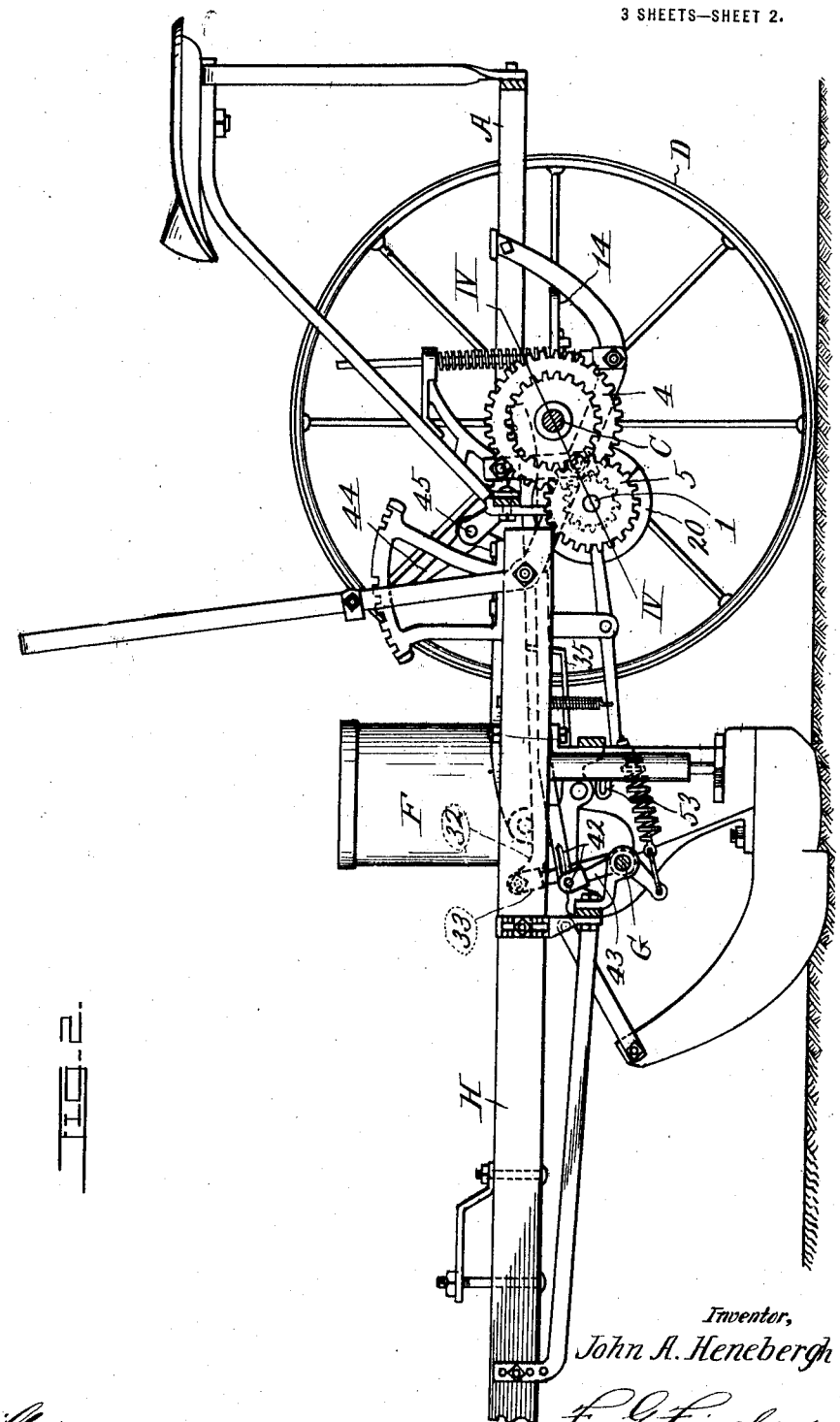

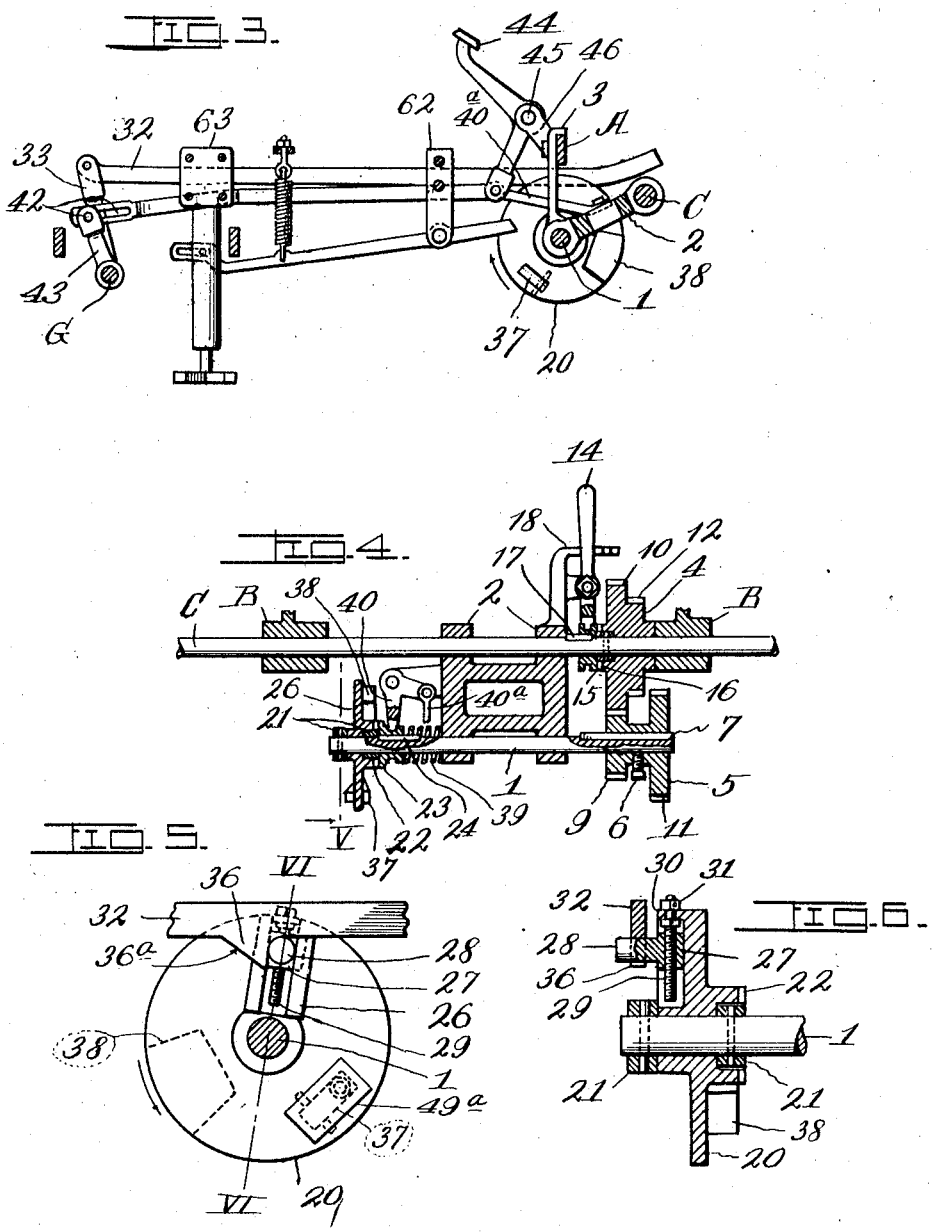

JOHN A. HENEBERGH, OF KANSAS CITY, MISSOURI, ASSIGNOR OF ONE-HALF TO BROOKING T. HICKMAN, OF KANSAS CITY, MISSOURI.

CORN-PLANTER.

1,330,586.  Specification of Letters Patent.  Patented Feb. 10, 1920.

Application filed October 2, 1916. Serial No. 123,205.

*To all whom it may concern:*

Be it known that I, JOHN A. HENEBERGH, a citizen of the United States, residing at Kansas City, in the county of Jackson and State of Missouri, have invented certain new and useful Improvements in Corn-Planters, of which the following is a specification.

My invention relates to improvements in check row corn planters, and embodies an attachment for automatically actuating the mechanism in the seed boxes for controlling the dropping of the corn.

The invention also embodies means whereby said plates may be manually operated, so that the corn for one row of hills can be planted in transverse alinement with the corn in the preceding hills.

By the use of my invention the wire which is generally stretched across the field to operate the seed box plates is dispensed with, as all parts of my invention are mounted upon and carried by the corn planter itself.

In order that the invention may be fully understood, reference will now be made to the accompanying drawings, in which:

Figure 1 is a plan view of the major portion of a corn planter equipped with my attachment.

Fig. 2 is an irregular longitudinal section on line II—II of Fig. 1.

Fig. 3 is a side elevation, partly in section of certain parts employed in carrying out the invention.

Fig. 4 is a section on line IV—IV of Fig. 2.

Fig. 5 is an enlarged section on line V of Fig. 4, with some of the parts removed.

Fig. 6 is a cross section on line VI—VI of Fig. 5.

Referring now in detail to the various parts, A designates the frame of the corn planter which is of the usual construction. Said frame is provided with bearings B in which an axle C is journaled. D are the two carrying and seed covering wheels, one of which is loosely-mounted upon the axle C, while the other is fixed thereon by suitable means such as a set screw E to drive said axle. F designates the usual seed-boxes arranged in advance of the wheels D and provided with the customary corn dropping mechanism controlled by the usual rock shaft G, which in the present instance is actuated by my attachment instead of the usual wire stretched across the field being seeded.

Referring now in detail to my attachment: 1 designates a jack shaft journaled in a frame 2, having its rear end mounted upon the axle C and its forward end secured to arms 3 depending from an adjacent portion of the frame A. Said jack shaft 1 is adapted to be driven at two different speeds from the axle C through the intermediacy of a double-faced gear wheel 4, loosely mounted upon said axle, and a double-faced gear 5 which is slidable on the jack shaft 1, but normally locked thereto by a set screw 6. A feather 7 is also interposed between the jack shaft 1 and the hub of the gear wheel 5 to insure the rotation of the latter with said jack shaft.

When corn is to be dropped in hills fairly close together the lower periphery 9 of the gear wheel 5 is shifted into engagement with the high periphery 10 of the gear wheel 4, and when the corn is to be planted in hills a greater distance apart the high periphery 11 of said gear wheel 5 is shifted into engagement with the low periphery 12 of the gear wheel 4. The shifting of the gear wheel 5 is readily accomplished after loosening the set screw 6.

When the planter is traveling to or from a field or at any other time desired, the corn dropping mechanism can be stopped by throwing the gear wheel 4 out of fixed relation to the axle C through the intermediacy of a lever 14, a clutch member 15 controlled by said lever 14, and a clutch member 16 formed on the hub of the gear wheel 4. The clutch member 15 is free to slide on the axle C, but is made to rotate therewith through the intermediacy of a feather 17. A notched segment 18 projecting rearwardly from the frame 2 serves to hold the lever 14 reliably in either of its adjusted positions.

Loosely-mounted upon the jack shaft 1 at the end opposite the gear 5, is a disk 20 held from lateral movement upon said jack shaft by two collars 21 and having a clutch member 22 integral with its hub for engagement with a companion clutch member 23 slidable upon the jack shaft 1, but made to rotate therewith through the intermediacy of a feather 24.

The disk 20 is provided at one side with a radial slideway 26, in which a block 27 carrying a wrist-pin 28 is slidably mounted to increase or diminish the circle described by said wrist-pin 28, so that the same can be adjusted to rock the shaft G through a greater or less arc as required, to insure proper operation of the seed-box mechanism. Thus it will be understood that my attachment can be adjusted for different makes of planters in which the rock shafts G have more or less movement. Adjustment of the block 27 in the slideway 26 is effected by a screw 29, journaled in a peripheral lug 30 on the disk 20 and provided at its outer end with a rectangular head 31, whereby it may be rotated for adjustment of the block 27.

The wrist-pin 28 at each revolution retracts a reciprocable bar 32 pivotally connected at its forward end to a crank 33, fixed upon the rock shaft G. The rear portion of the bar 32 is supported in proper relation to the wrist-pin 28 by a guide 35, secured to an adjacent portion of the frame A. A shoulder 36 depending from the bar 32 in the path of the wrist-pin 28 affords means whereby the latter retracts said bar 32 on each revolution of the disk 20.

The opposite side of the disk 20 from that on which the slideway 26 is located is provided with a counterweight 38, adapted to rotate said disk 20 and thus automatically bring the wrist-pin 28 into proper relation with the shoulder 36 when the clutch member 23 is thrown out of engagement with the clutch member 22.

The clutch member 23 is thrown out of engagement with the clutch member 22, against the action of an expansion spring 39 by a bell-crank 40, pivotally connected at one end to a link 40ª pivoted at its forward end to a foot lever 44, the fulcrum 45 of which is mounted in a bearing 46.

41 designates a connecting bar having a pin-and-slot connection 42 with a crank 43, fixed upon the rock shaft G beside the crank 33. Said connecting bar 41 is manually controlled by the foot lever 44.

The operation briefly stated is as follows: When starting to plant hills in a row the clutch member 15 is thrown into engagement with the clutch member 16, so that the axle C will drive the jack shaft 1 through the intermediacy of the gear wheels 4 and 5. The rotation of said jack shaft 1 in the direction of the arrow, Fig. 3, causes the disk 20 to rotate therewith, thereby bringing the wrist-pin 28 into engagement with the shoulder 36, which is thus retracted and in turn actuates the seed box mechanism. When the wrist-pin 28 passes out of engagement with the shoulder 36, the bar 32 is carried forward to its initial position by the seed box mechanism, while the upper rear end of said bar 32 drops and rests upon the axle C until another revolution of the disk 20 carries the wrist-pin 28 into engagement with said shoulder 36. Thus it will be understood that while the machine is in operation the seed box mechanism will be actuated at regular intervals and drop the seed corn in hills uniform distances apart. Should the ground be hilly or uneven, the regular dropping of the seed corn by the automatic mechanism would in time result in the hills becoming irregular and out of alinement with each other, so in order to obviate this the foot lever 44 is depressed to render the disk 20 idle and at the same time adjust the seed box mechanism in position to drop the seed corn. By continuing to hold the foot lever 44 depressed, any distance may be traversed before further seed corn is deposited in the soil. Just before arriving at the point where it is desired to sow another hill of corn the foot lever 44 is released to allow the bar 32 to move forward, so that it may be retracted by the wrist-pin 28 to actuate the seed bar mechanism. In order that the position of the wrist-pin 28 will be in a predetermined position before the lever 44 is released, the counterweight 38 is provided to rotate the disk and raise said wrist-pin 28 to approximately the position disclosed by Fig. 5. The rotation of the disk 20 in either direction by the counterweight 38 is easily effected when the clutch member 23 is thrown out of engagement by the clutch member 22.

While I have shown and described the preferred form of my invention, I reserve the right to make such changes in the combination, construction and arrangement of parts as properly fall within the spirit and scope of the claims.

Having thus described my invention, what I claim and desire to secure by Letters Patent, is:

1. In combination with a corn planter, a reciprocatory shouldered element for actuating the seed-box mechanism of the planter, rotary means having an adjustable member for engaging the shoulder and actuating said element at intervals, gearing driven by the corn planter for driving said rotary means, a manually-controlled clutch for throwing the rotary means out of operative relation with said gearing, and an element on said rotary means to automatically restore it to operative relation with the reciprocatory element when the clutch is operated.

2. In combination with a corn planter, a reciprocatory element for actuating the seed-box mechanism of the planter, rotary means for actuating said element, gearing driven by the corn planter for driving said rotary means, a clutch for throwing the rotary means out of operative relation with said gearing, and manually-controlled means for simultaneously actuating said clutch and the seed-box mechanism.

3. In combination with a corn planter, reciprocatory means for actuating the seed box mechanism of the planter, a rotary disk geared to the corn planter, a wrist pin for operating said reciprocatory means, a slideway on the disk in which said wrist pin is mounted, means for adjusting the wrist pin toward or away from the axis of the disk, a clutch for throwing the disk out of gear, and weighted means on the disk to automatically restore it to operative relation with the seed box actuating means when the clutch is operated.

4. In combination with a corn planter, a reciprocatory bar provided with a shoulder and adapted to actuate the seed box mechanism of the planter, a rotary element geared to the corn planter, a wrist pin carried by said rotary element for engaging the shoulder and actuating the reciprocatory bar, and a threaded element for adjusting said wrist-pin relative to the axis of the rotary element to impart variable strokes to the reciprocatory bar.

5. In combination with a corn planter, an element for actuating the seed box mechanism of the planter, rotary means for actuating said element, a clutch member on said rotary element, a clutch member geared to the corn planter and adapted to drive the first clutch member, resilient means for yieldingly-holding the second clutch member in engagement with the first clutch member, a bell-crank for throwing the second clutch member out of engagement with the first clutch member, a lever operably-connected to said bell-crank to actuate the same, and means connected to said lever and the seed box mechanism to actuate the latter when the second clutch member is thrown out of engagement with the first clutch member.

6. In combination with a corn planter, a reciprocatory element provided with a shoulder and adapted to actuate the seed box mechanism of the planter, a rotary disk geared to the corn planter, means for throwing said disk out of gear with the corn planter, a wrist-pin carried by the disk for engaging the shoulder of the reciprocatory element to actuate the same, and a counterweight on the disk to rotate the same when thrown out of gear, for the purpose of bringing the wrist pin in position to engage the shoulder on the reciprocatory element.

In testimony whereof I affix my signature in the presence of two witnesses.

JOHN A. HENEBERGH.

Witnesses:
F. G. FISCHER,
L. J. FISCHER.